June 10, 1958    W. P. STRUMBOS    2,838,301
TORSION SPRING
Filed Oct. 28, 1955
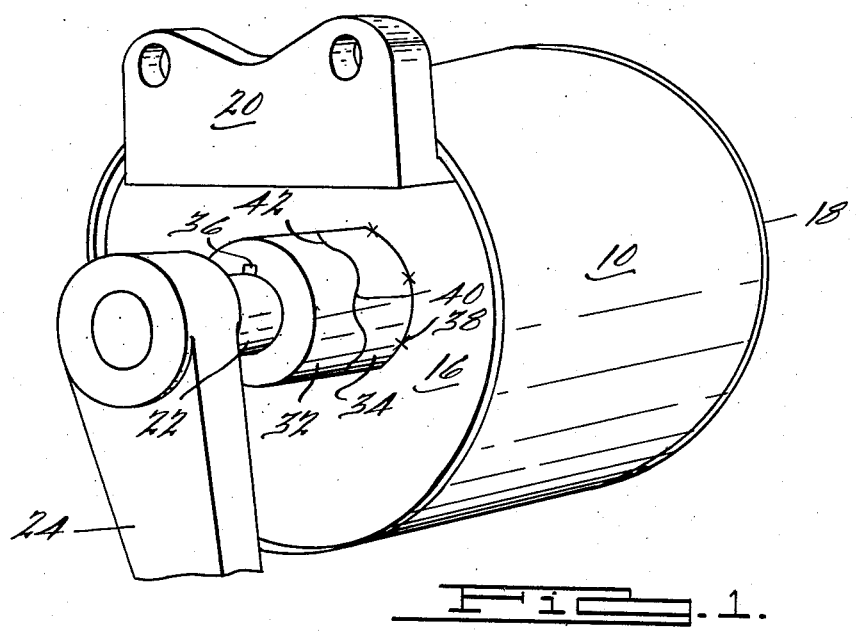
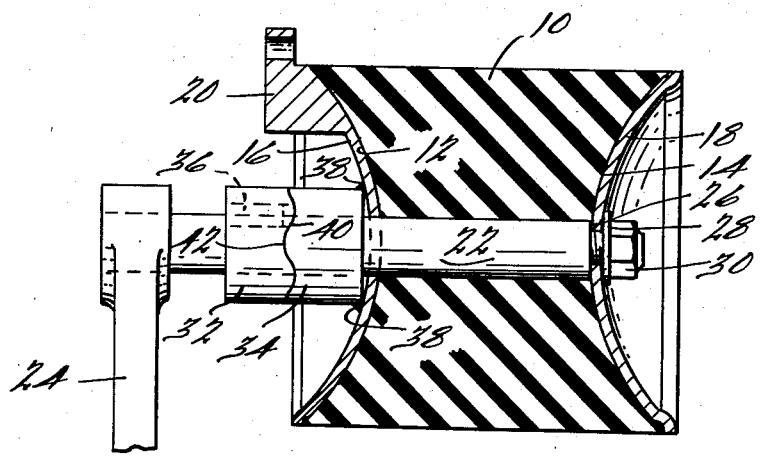
INVENTOR.
William P. Strumbos
BY
Harness, Dickey & Pierce
ATTORNEYS

United States Patent Office 2,838,301
Patented June 10, 1958

2,838,301

TORSION SPRING

William P. Strumbos, Livonia, Mich.

Application October 28, 1955, Serial No. 543,347

4 Claims. (Cl. 267—57.1)

This invention relates to new and useful improvements in rubber torsion springs.

Rubber springs are superior to other types of springs in many instances. They can be engineered more easily to produce a desired effect, and they have the advantage of deadening or muting noises which otherwise are transmitted through the springs. This latter characteristic makes these springs particularly desirable for use in automotive vehicles where they tend to reduce the level and harshness of road noises.

An important object of the present invention is to provide a rubber torsion spring having general utility but which is primarily adapted and pre-eminently suited for use on automotive vehicles.

Another object of the invention is to provide a rubber torsion spring that is simple in construction, efficient in operation, and relatively inexpensive to manufacture.

Still another object of the invention is to provide a rubber torsion spring that is uniquely constructed to place the rubber simultaneously in compression and shear so as to provide high shock-damping properties.

Other objects and advantages of the invention will be apparent during the course of the following description.

In the drawing forming a part of this specification and wherein like numerals are employed to designate like parts throughout the same.

Fig. 1 is a perspective view of a rubber torsion spring embodying the invention, and Fig. 2 is a longitudinal sectional view of the spring.

In the drawing, wherein for the purpose of illustration is shown a preferred embodiment of the invention, the numeral 10 designates a solid body of rubber or other elastomaric material. The particular body 10 here shown is generally cylindrical in form, and it has opposite concave end surfaces 12 and 14. Inwardly dished, generally disk-shaped transverse members 16 and 18 fit snugly against the ends 12 and 14 respectively of the body 10. It will be observed that the transverse members 16 and 18 conform to the end surfaces of the body 10 and that they contact or engage the body over the full surface area thereof. Both transverse members 16 and 18 are vulcanized or otherwise bonded to the end faces of the body 10, and the member 16 is formed with a mounting bracket 20 by means of which the device can be fastened to a suitable support such as an automobile frame, for example.

In order to utilize the above construction as a spring, a shaft 22 extends axially through the two members 16 and 18 and the body 10. A crank arm 24 on and fixed to the shaft 22 is adapted to be fastened to a part to be damped as, for example, a wheel or other movable part of an automobile. The shaft 22 is free to rotate in the member 16 and is suitably fastened to the other member 18. Any desired means can be employed to fasten the shaft 22 to the member 18 and in the drawing the latter is shown clamped between a radial shoulder 26 on the shaft and a washer 28 which is mantained in pressed frictional engagement with the member 18 by means of a nut 30 on the end of the shaft 22. It will be readily appreciated, however, that, if necessary or desirable, the shaft 22 can be keyed or otherwise fixed to the member 18. Also, the two parts could be welded or brazed together. Manifestly, rotational movement imparted to the crank arm 24 pivots or rotates the shaft 22 and the transverse member 18. Since the latter is bonded to the body 10, rotation of the member 18 is yieldingly resisted by the body, and torsional shear stresses are created in the latter.

According to the present invention, rotational movement of the crank arm 24 and its adjuncts is translated to axial movement of the shaft 22 and transverse member 18 so as to compress the rubber body 10 simultaneously as it is placed in shear as described above. As clearly illustrated in the drawing, this is accomplished by means of co-operating cam elements 32 and 34 mounted on the shaft 22 adjacent the transverse member 16. Cam element 32 is fixed to the shaft 22 as by a key 36, and cam element 34 is fastened to the transverse member 16 as by tack welds 38. The co-operating end faces of the cam elements 32 and 34 are formed with alternate high and low areas which define inclined cam surfaces 40 and 42. When the crank arm 24 is rotatably actuated, the projections on the face of cam element 32 ride up the projections on the face of cam element 34 so that the two elements are progressively separated. Inasmuch as the transverse member 18 is fastened to the shaft 22, outward axial movement of cam element 32 is accompanied by corresponding axial movement of the member 18 in the direction of the body 10. Obviously, axial movement of the member 18 as described is yieldingly resisted by the body 10. Thus, any rotational movement of the arm 24 imparts a corresponding rotational movement to the member 18 and inevitably simultaneously through the cam elements 32 and 34 imparts an axial movement to the member 18. This compound motion of the member 18 places the body 10 simultaneously in compression and shear. Manifestly continued loading of the spring causes the torsional resistance of the rubber to be multiplied as the rubber is further compressed by the cam elements 32 and 34. Also, it will be apparent that the coefficient of friction between the cam elements 32 and 34 further stiffens the spring. The total effect is a variable rate spring having exceedingly high shock-damping properties.

Having thus described the invention, I claim:

1. A rubber spring comprising a body of elastomeric material, transverse disks bonded to opposite sides of said rubber body, an actuator having a rod extending axially through said rubber body and connected to one of said disks, means for fastening the other of said disks to a suitable stationary support, and co-acting cam elements on said rod, one of said cam elements being connected to the rod and the other of said cam elements being connected to said other disk, said cam elements having co-operating cam surfaces which coact when the rod is rotatably actuated to move said rod axially so as to press said one disk against said rubber body whereby said body is subjected simultaneously to shear and compression to resist rotative movement of said rod.

2. A rubber spring comprising a body of elastomeric material, stationary and movable members at opposite sides and bonded to said rubber body confining the latter therebetween, a rotatable actuator extending through said rubber body and connected to said movable member, and co-operating cam elements on the actuator exteriorly of said body, one of said cam elements being fixed to the actuator and the other of said cam elements being fixed to said stationary member, said cam elements having co-operating inclined cam surfaces bearing each against the other and co-acting when the actuator is rotated to move said actuator axially in a direction to press said movable member against said rubber body to place the latter simultaneously in shear and compression so as to resist rotative movement of said actuator.

3. A rubber spring comprising a body of elastomeric material, stationary and movable members bonded to opposite sides of said body and confining the body therebetween, a rotatable and axially movable actuator connected to said movable member, and means including co-operating cam elements for translating rotational movement of the actuator into axial movement thereof, said cam elements having inclined cam surfaces bearing each directly on the other, and acting to move the actuator axially in a direction to press said movable member against said body whereby to place the latter simultaneously under shear and compression.

4. A rubber spring comprising a body of elastomeric material, means confining said body including stationary and movable platelike members at and bonded to opposite sides of the body, an actuator for moving said movable member rotatably and simultaneously axially in the direction of said body including co-acting cam elements on said actuator, said cam elements having inclined cam surfaces bearing each directly on the other, and translating rotative movement of the actuator into axial movement thereof, and actuation of said movable member placing said body simultaneously under shear and compression so that the body increasingly resists rotational movement of said actuator.

References Cited in the file of this patent

UNITED STATES PATENTS

| | | |
|---|---|---|
| 807,968 | Seery | Dec. 19, 1905 |
| 2,203,342 | Sloman et al. | June 4, 1940 |
| 2,231,037 | Taylor | Feb. 11, 1941 |
| 2,380,191 | Sauzedde | July 10, 1945 |